United States Patent Office 2,995,550
Patented Aug. 8, 1961

2,995,550
STEROIDAL INTERMEDIATES
Josef Fried, Princeton, and Patrick A. Diassi, Westfield, N.J., assignors to Olin Mathieson Chemical Corporation, New York, N.Y., a corporation of Virginia
No Drawing. Filed Apr. 18, 1960, Ser. No. 22,672
6 Claims. (Cl. 260—239.55)

This invention relates to, and has for its object the provision of a method for preparing physiologically active steroids, involving the preparation of new steroidal intermediates of this invention.

Thus, in accordance with this invention there is provided a method for the synthesis of compounds of the formula

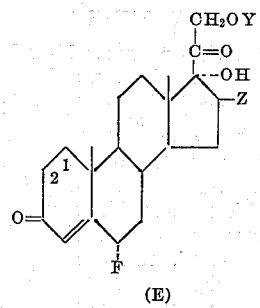

(E)

wherein the 1,2-position is saturated or double bonded; Z is chloro, bromo or iodo; and Y is hydrogen or the acyl radical of a hydrocarbon carboxylic acid of less than ten carbon atoms, e.g., the lower alkanoic acids as exemplified by acetic, propionic, and heptanoic acids; the lower alkenoic acids, the ar-(lower)alkanoic acids as exemplified by α-toluic acid and β-phenylpropionic acids; the cycloalkanoic acids as exemplified by cyclopentyl propionic acid; the cycloalkenoic acids, and the aromatic acids as exemplified by o, m and p-methylbenzoic acids.

Compounds of Formula E are useful as intermediates in the preparation of other steroids having pharmacological activity. Thus they can be converted to the 16β-Z-17α-acyloxy-derivatives of Formula F, as by treatment with a strong acid, e.g., perchloric acid, and an acid anhydride, e.g., acetic anhydride. Compounds of formula F are then treated in an acidic aqueous medium with a salt of a strong base and a weak acid, such as sodium acetate, to yield the corresponding 6α-fluoro-16α-acyloxy-17α-hydroxy derivatives of Formula G, which are then hydrolyzed to the corresponding 16α-hydroxy-derivatives. The latter can be converted, by known procedures, to 6α-fluoro-16α-hydroxy-hydrocortisone and 6α-fluoro-16α-hydroxy-prednisolone, having thymolytic and anti-inflamatory activity.

The processes of this invention are represented schematically by the following equations:

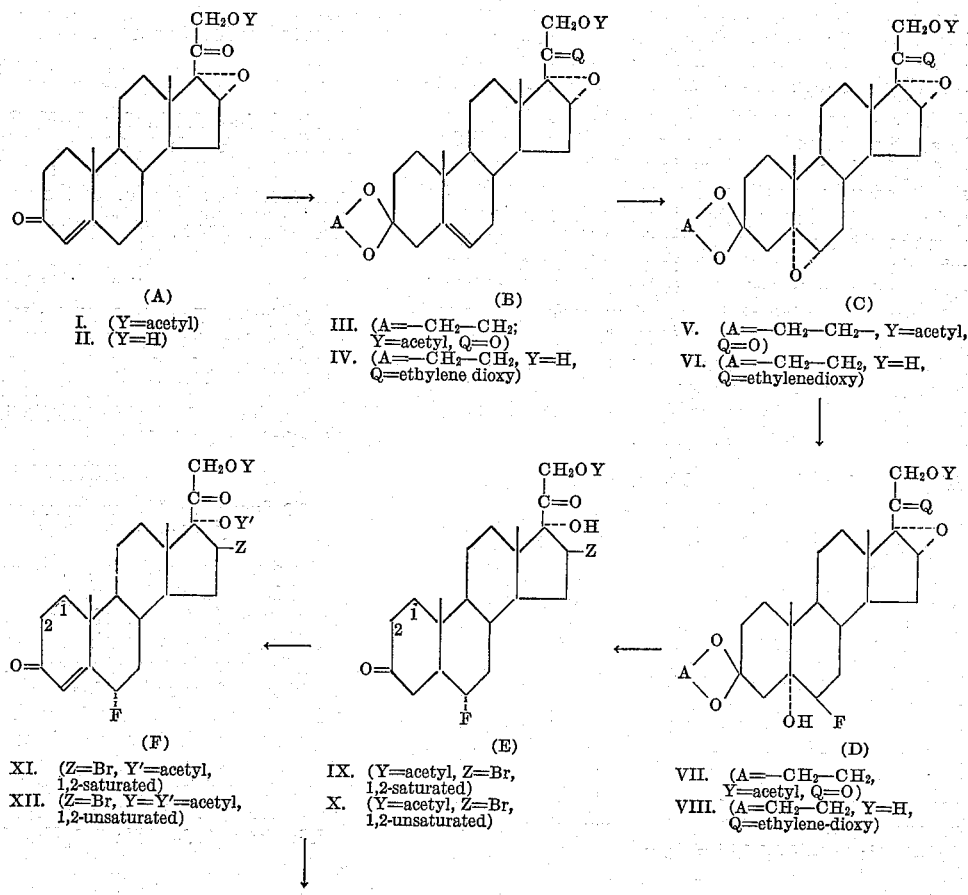

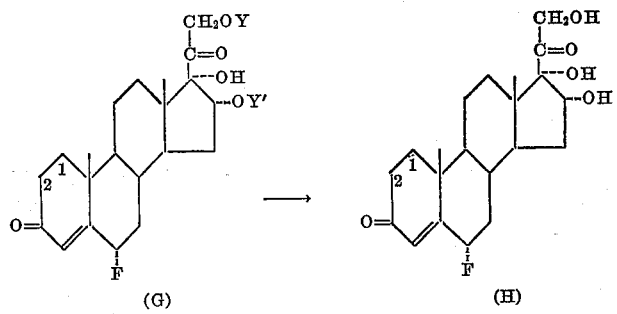

XIII. (Y=Y'=acetyl, 1,2-saturated)
XIV. (Y=Y'=acetyl, 1,2-unsaturated)

XVI. (1,2-saturated)
XVI. (1,2-unsaturated)

wherein A is a lower alkylene radical, preferably having two or three carbon atoms in the chain as exemplified by ethylene and propylene; Z is iodo, bromo or chloro; Q is oxo when Y is acyloxy, and lower alkylenedioxy when Y is hydrogen; Y' is the acyl radical of a hydrocarbon carboxylic acid of less than ten carbon atoms, such as the lower alkanoic acids (e.g., acetic propionic, n-butyric, and enanthic acid), lower alkenoic acids, lower cycloalkanoic acids, lower cycloalkenoic acids, monocyclic aryl carboxylic acids (e.g., benzoic acid), and monocyclic aralkanoic acids (e.g., phenylacetic acid); Y is hydrogen or Y'; and the 1,2-position is saturated or double bonded.

Compound E can be prepared by first treating compounds of Formula A with a ketalizing agent such as a lower alkanediol (e.g., ethylene glycol and propylene glycol) in acid medium thereby forming the 3-alkylenedioxy-20-Q-21-OY-$\Delta^{5(6)}$-pregnene of Formula B wherein Q is alkylenedioxy when Y is H, or Q is keto (oxo when Y is acyl. Compounds B are then epoxidized across the 5,6-unsaturation by treatment with an organic peracid such as perphthalic, perbenzoic and peracetic acids to yield the diepoxy compounds of Formula C. The latter are treated with a fluorinating agent such as boron trifluoride, thereby selectively opening the epoxy group in the 5$\alpha$,6$\alpha$-position and introducing a 5$\alpha$-hydroxy and a 6$\beta$-fluoro-group thus yielding compounds D. Compounds D are then treated with a hydrogen halide (e.g. HBr, HI and HCl) in a lower alkanoic acid (e.g. acetic acid) to simultaneously hydrolyze off the ketal groups, introduce a double bond in the 4,5-position by dehydration and invert the 6$\beta$-fluoro group, thereby yielding compound E wherein the 1,2-position is saturated. If a 1,2-unsaturated derivative is desired, it is formed by microbiological 1,2-dehydrogenation with *Bacterium cyclooxydans* as described in U.S. Patent No. 2,822,318.

The following examples are presented for the purpose of more fully illustrating the present invention (all temperatures being expressed in degrees centigrade):

EXAMPLE 1

*16$\alpha$,17$\alpha$-oxido-$\Delta^5$-pregnene-21-ol-20-one 3-ethylene ketal 21-acetate (III)*

A solution of 5.0 g. of 16$\alpha$,17$\alpha$-oxidodesoxycorticosterone 21-acetate (I) in a mixture of 5 ml. of ethylene glycol and 165 ml. of benzene is refluxed for 1 hour using a Dean Stark separator for collecting the distilled water. To this solution 332 mg. of p-toluenesulfonic acid is added and the mixture is refluxed for 4 hours with stirring. The reaction mixture is cooled and extracted with saturated sodium bicarbonate. The organic phase is then washed well with water, dried over anhydrous sodium sulfate, filtered and concentrated to an approximate volume of 30 ml., in vacuo. Addition of hexane to the concentrated solution gives about 2.1 g. of the crystalline product (III) of the following properties: M.P. about 168–170°; [$\alpha$]$_D^{23}$+25.3° chlf.);

$\lambda_{max.}^{Nujol}$ 5.71, 5.81$\mu$

*Analysis.*—Calc'd for $C_{25}H_{34}O_6$: C, 69.74; H, 7.96. Found: C, 69.72; H, 8.06.

Following the procedure of Example 1 except for the substitution as starting material of 16$\alpha$,17$\alpha$-oxido-$\Delta^4$-pregnene-21-ol-3,20-dione (II), there is obtained as product, 16$\alpha$,17$\alpha$-oxido-$\Delta^5$-pregnene-3,20-bis(ethylene ketal) (IV).

EXAMPLE 2

*5$\alpha$,6$\alpha$;16$\alpha$,17$\alpha$-dioxido - pregnane-21-ol-20-one 3-ethylene ketal 21-acetate (V)*

A solution of 150 mg. of 16$\alpha$,17$\alpha$-oxido-$\Delta^5$-pregnene-21-ol-20-one 3-ethylenedioxy ketal 21-acetate (III) in 10 ml. of chloroform is cooled to 0° and 2.13 ml. of 0.37 N monoperphthalic acid in ether is added. The reaction is left at 0° for 16 hours and then poured into a cold mixture of chloroform and dilute sodium bicarbonate. The chloroform is separated, washed several times with water and evaporated to dryness. Fractional crystallization of the residue from acetone gives 5$\alpha$,6$\alpha$;16$\alpha$,17$\alpha$-dioxido-pregnane-21-ol-20-one 3-ethylene ketal 21-acetate (V) as the more insoluble component. It has the following properties: M.P. about 210–212°, [$\alpha$]$_D^{23}$+22° (chlf.);

$\lambda_{max.}^{Nujol}$ 5.74, 5.78$\mu$

*Analysis.*—Calc'd for $C_{25}H_{34}O_7$ (446.52): C, 67.24; H, 7.68. Found: C, 67.21; H, 7.46.

Further addition of hexane to the acetone mother liquor causes precipitation of the corresponding 5$\beta$,6$\beta$-oxide having the following properties: M.P. about 176–178°, [$\alpha$]$_D^{23}$+46° (chlf.);

$\lambda_{max.}^{Nujol}$ 5.72, 5.81$\mu$

*Analysis.*—Found: C, 67.44; H, 7.63.

Following the procedure of Example 2 except for the substitution of 16$\alpha$,17$\alpha$-oxido-$\Delta^5$-pregnene-21-ol-3,20-bis ethylene ketal (IV) there is readily obtained as product the compound 5$\alpha$,6$\alpha$;16$\alpha$,17$\alpha$-dioxido-pregnane-21-ol-3,20-bis ethylene ketal (VI).

EXAMPLE 3

*6$\beta$-fluoro-16$\alpha$,17$\alpha$-oxidopregnane-5$\alpha$,21-diol-20-one 3-ethylene ketal 21-acetate (VIII)*

To a solution of 3.0 g. 5$\alpha$,6$\alpha$;16$\alpha$,17$\alpha$-dioxido-pregnane-21-ol-20-one-3-ethylene ketal 21-acetate in 500 ml. of dry benzene and 500 ml. of dry ether is added 12.5 ml. of freshly distilled boron trifluoride-etherate and the reaction is left at room temperature overnight. Nine hundred milliliters of water is added and the mixture is neutralized with dilute sodium bicarbonate. The organic phase is separated, washed several times with water, dried over anhydrous sodium sulfate, filtered and evaporated to dryness. Crystallization of the residue from methanol gives about 1.97 g. of VII having the following properties: M.P. about 173–175°; [$\alpha$]$_D^{23}$+22.5 (chlf.);

$\lambda_{max.}^{EtOH}$ none; $\lambda_{max.}^{Nujol}$ 2.91, 5.74, 5.80, 8.17$\mu$

*Analysis.*—Calc'd for $C_{25}H_{35}O_7F$: C, 64.36; H, 7.56; F, 4.07. Found: C, 64.55; H, 7.76; F, 3.94.

Similarly, by substituting an equivalent amount of 5α,6α;16α,17α-dioxido pregnane-21-ol-3,20-bis-ethylene ketal for the dioxide in the procedure of Example 3, 6β-fluoro-16α,17α-oxidopregnane-5α,21-diol 3,20-bis-ethylene ketal (VIII) is obtained.

EXAMPLE 4

*6α-fluoro-16β-bromo-Δ⁴-pregnene-17α,21-diol-3,20-dione 21-acetate (IX)*

To a solution of 100 mg. of 6β-fluoro-16α,17α-oxidopregnane-5α,21-diol-20-one 21-acetate 3-ethylene ketal (VII) in 1 ml. of acetic acid, is added 0.1 ml. of 33% HBr in acetic acid and the reaction mixture is left at room temperature for two hours. It is then diluted with water, extracted with chloroform and the chloroform extract washed with dilute sodium bicarbonate and water. The chloroform extract is evaporated to dryness and the residue crystallized from acetone-hexane to give about 71 mg. of 6α-fluoro-16β-bromo-Δ⁴-pregnene-17α,21-diol-3,20-dione 21-acetate (IX) having the following properties: M.P. about 139–140°; $[\alpha]_D^{23}+69.0$ (chlf.);

$$\lambda_{max.}^{EtOH} \ 234 \ m\mu \ (\epsilon=14,700)$$
$$\nu_{max.}^{Nujol} \ 2.90, \ 5.76, \ 5.82, \ 6.00, \ 6.18\mu$$

*Analysis.*—Calc'd for $C_{23}H_{30}O_5FBr$: C, 56.91; H, 6.23; Br, 16.47. Found: C, 57.36; H, 6.52; Br, 16.62.

Following the procedure of Example 4 except for the substitution of 6β-fluoro-16α,17α-oxidopregnane-5α,21-diol 3,20-bis(ethylene ketal) (VIII) as the starting steroid material there is obtained as product the compound 6α-fluoro-16β-bromo-Δ⁴-pregnene-17α,21-diol-3,20-dione.

The corresponding 16β-chloro and 16β-iodo-compounds are obtained by the procedure of Example 4 when VII is treated with HCl and HI, respectively.

The Δ¹-derivatives of IX is obtained by subjecting it to dehydrogenation with the enzymes of *Bacterium cyclooxydans* in accordance with the procedure of Example 1 of U.S. Patent No. 2,822,318 and separating the product X from the fermentation broth.

EXAMPLE 5

*6α-fluoro-16β-bromo-Δ⁴-pregnene-17α,21-diol-3,20-dione 17,21-diacetate (XI)*

To a stirred suspension of 500 mg. of 6α-fluoro-16β-bromo-Δ⁴-pregnene-17α,21-diol-3,20-dione 21-acetate (IX) in 100 ml. of acetic anhydride, is added 0.2 ml. of a solution of 0.1 ml. of 70% perchloric acid in 10 ml. of acetic anhydride. The mixture is stirred for 30 minutes during which time the steroid dissolves giving a dark solution which is then poured onto ice and stirred vigorously until the acetic anhydride is hydrolyzed. The mixture is extracted with chloroform and the chloroform extract neutralized with sodium bicarbonate, washed again with water and evaporated to dryness in vacuo. Crystallization of the residue from acetone-hexane gives about 270 mg. of XI having the following characteristics: M.P. about 161–163°;

$$\lambda_{max.}^{EtOH} \ 234 \ m\mu \ (\epsilon=16,000); \ \lambda_{max.}^{Nujol} \ 5.78, \ 6.05; \ 6.20\mu$$

*Analysis.*—Calc'd for $C_{25}H_{32}O_6BrF$: C, 56.93; H, 6.12; F, 3.62. Found: C, 56.75; H, 6.17; F, 3.56.

Compound XI upon Δ¹-dehydrogenation as described hereinbefore yields 6α-fluoro-16β-bromo-Δ¹,⁴-pregnadiene-17α,21-diol-3,20-dione 17,21-diacetate (XII).

EXAMPLE 6

*6α-fluoro-Δ⁴-pregnene-16α,17α,21-triol-3,20-dione 16,21-diacetate (XIII)*

A solution of 596 mg. of 6α-fluoro-16β-bromo-Δ⁴-pregnene-17α,21-diol-3,20-dione 17,21-diacetate (XI) and 1 g. of sodium acetate in 20 ml. of acetic acid is heated on a steam bath for 3 hours. The solution is then cooled, diluted with water and extracted with chloroform. The chloroform extract is washed well with water and evaporated to dryness. Crystallization of the residue from acetone-hexane gives about 310 mg. of 6α-fluoro-Δ⁴-pregnene-16α,17α,21-triol-3,20-dione 16,21-diacetate (XIII) of the following characteristics: M.P. about (bubbling 140°) 202–204°; $[\alpha]_D+38.3°$ (chlf);

$$\lambda_{max.}^{EtOH} \ 235 \ m\mu \ (\epsilon=14,000)$$
$$\lambda_{max.}^{Nujol} \ 2.90, \ 5.74–5.80, \ 5.90, \ 6.00, \ 6.18\mu$$

*Analysis.*—Calc'd for $C_{25}H_{33}O_7F$ (464.50): C, 64.64; H, 7.16; F, 4.09. Found: C, 64.71; H, 7.22; F, 4.07.

Compound XIII is converted to its Δ¹-derivative (XIV) by fermentative Δ¹-dehydrogenation with *B. cyclooxydans.*

EXAMPLE 7

*6α-fluoro-Δ⁴-pregnene-16α,17α,21-triol-3,20-dione (XV)*

To 200 mg. of 6α-fluoro-Δ⁴-pregnene-16α,17α,21-triol-3,20-dione 16,21-diacetate (XIII) is added 13.5 ml. of methanol and 6.63 ml. of 10% potassium carbonate and the solution is left under nitrogen for 1 hour at room temperature. The solution is then neutralized with 10% acetic acid, diluted with water and extracted with chloroform. The chloroform extract is washed well wtih water and evaporated to dryness in vacuo. Crystallization of the residue from acetone gives about 60 mg. of 6α-fluoro-Δ⁴-pregnene-16α,17α,21-triol-3,20-dione (XV) having the following properties: M.P. about 218–220°; $[\alpha]_D+69.1°$ (dioxane);

$$\lambda_{max.}^{EtOH} \ 235 \ m\mu \ (\epsilon=17,200); \ \lambda_{max.}^{Nujol} \ 2.89, \ 5.84, \ 5.99, \ 6.19\mu$$

*Analysis.*—Calc'd for $C_{21}H_{29}O_5F$: C, 66.30; H, 7.68. Found: C, 65.80; H, 7.68.

Δ¹-dehydrogenation of XV, as described hereinbefore yields the corresponding Δ¹,⁴-derivative (XVI).

This invention may be variously otherwise embodied within the scope of the appended claims.

What is claimed is:

1. A steroid of the formula:

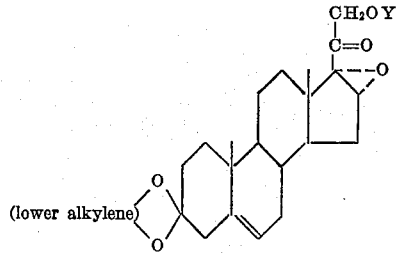

wherein Y is the acyl radical of a hydrocarbon carboxylic acid having less than ten carbon atoms.

2. A steroid of the formula:

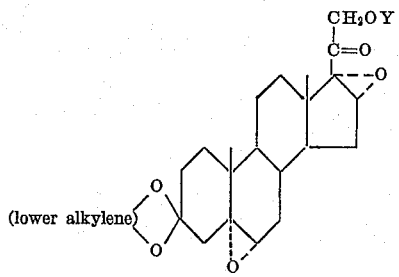

wherein Y is the acyl radical of a hydrocarbon carboxylic acid having less than ten carbon atoms.

3. A steroid of the formula:
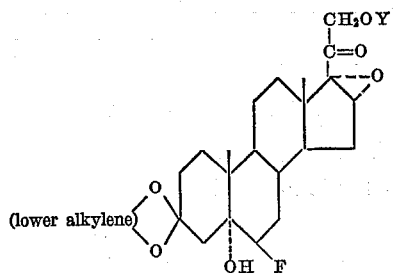
wherein Y is the acyl radical of a hydrocarbon carboxylic acid having less than ten carbon atoms.
4. A steroid of the formula
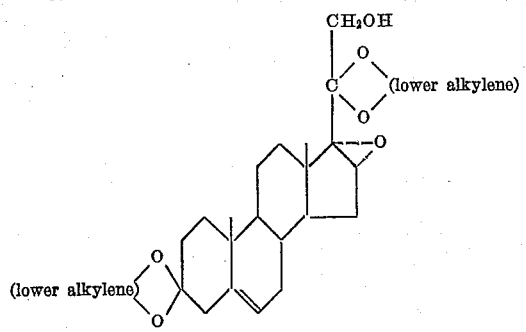
5. A steroid of the formula
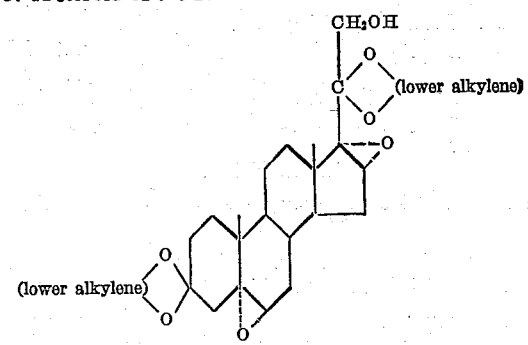
6. A steroid of the formula
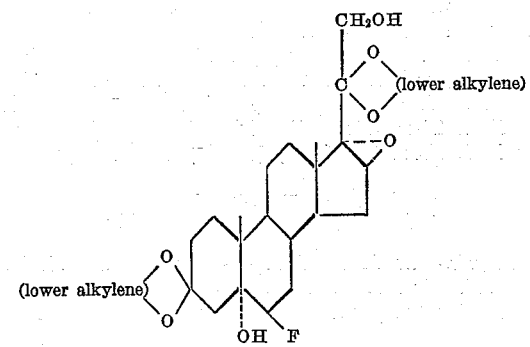
References Cited in the file of this patent
UNITED STATES PATENTS
2,881,168  Spero et al. _____ Apr. 7, 1959
OTHER REFERENCES
Antonucci et al.: J. Org. Chem., vol. 17, pages 1369–1374 (1952).
Bowers et al.: J.A.C.S., vol. 80, pages 4423–4424 (1958).